United States Patent
L G et al.

(10) Patent No.: US 10,057,153 B1
(45) Date of Patent: Aug. 21, 2018

(54) DETECTING SLOW VIRTUAL DEVICES

(71) Applicant: Cisco Technology, Inc., San Jose, CA (US)

(72) Inventors: Rajesh L G, Karnataka (IN); Saket Jain, Haryana (IN); Sudhansu Sekhar Naik, Odisha (IN); Praveen Madhunapantula, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 164 days.

(21) Appl. No.: 15/171,286

(22) Filed: Jun. 2, 2016

(51) Int. Cl.
*H04L 12/26* (2006.01)
*H04L 12/46* (2006.01)

(52) U.S. Cl.
CPC ........ *H04L 43/106* (2013.01); *H04L 12/4641* (2013.01); *H04L 43/062* (2013.01); *H04L 43/0864* (2013.01); *H04L 43/067* (2013.01)

(58) Field of Classification Search
CPC . H04L 43/106; H04L 12/4641; H04L 43/062; H04L 43/0864; H04L 43/067; H04L 43/10
USPC ........................................................ 370/252
See application file for complete search history.

(56) References Cited

U.S. PATENT DOCUMENTS

| | | | | |
|---|---|---|---|---|
| 7,058,706 B1 * | 6/2006 | Iyer | ..................... | H04L 43/0852 709/223 |
| 8,553,710 B1 * | 10/2013 | White | ..................... | H04L 49/10 370/389 |
| 9,158,570 B2 | 10/2015 | Kanda et al. | | |
| 9,225,672 B1 * | 12/2015 | Dropps | ................. | H04L 49/254 |
| 9,524,182 B2 * | 12/2016 | Kanda | ..................... | H04L 47/10 |
| 2001/0033552 A1 | 10/2001 | Barrack et al. | | |
| 2009/0116381 A1 | 5/2009 | Kanda | | |
| 2010/0061236 A1 * | 3/2010 | Joshi | ..................... | H04J 3/0682 370/231 |
| 2010/0122111 A1 * | 5/2010 | Allen | ................... | G06F 11/2005 714/3 |
| 2010/0257269 A1 * | 10/2010 | Clark | ..................... | G06F 9/4856 709/226 |
| 2011/0191610 A1 * | 8/2011 | Agarwal | ................ | G06F 1/3203 713/310 |
| 2012/0063333 A1 * | 3/2012 | Gnanasekaran | ......... | H04L 47/10 370/252 |
| 2012/0158996 A1 * | 6/2012 | Thaler, III | ........... | H04L 43/0864 709/241 |

(Continued)

*Primary Examiner* — Un C Cho
*Assistant Examiner* — Shah Rahman
(74) *Attorney, Agent, or Firm* — Edell, Shapiro & Finnan, LLC

(57) ABSTRACT

A first packet is sent via a network from a first network device to a first virtual device executing on a second network device. A first credit return is received, via the network, at the first network device. A first time duration is calculated as a time between the sending of the first packet and receipt of the first credit return. A second packet is sent via the network from the first network device to a second virtual device executing on the second network device. A second credit return is received at the first network device. A second time duration is calculated as a time between the sending of the second packet and receipt of the second credit return. Relative performance rankings are assigned to the first virtual device and the second virtual device based upon at least the first time duration and the second time duration.

20 Claims, 7 Drawing Sheets

(56) References Cited

U.S. PATENT DOCUMENTS

| | | | |
|---|---|---|---|
| 2013/0258850 A1* | 10/2013 | Mayya | H04L 47/12 370/235 |
| 2014/0052864 A1* | 2/2014 | Van Der Linden | G06F 9/5077 709/226 |
| 2014/0280885 A1* | 9/2014 | Ayandeh | H04L 43/0894 709/224 |
| 2014/0294379 A1* | 10/2014 | L G | H04B 10/25 398/28 |
| 2015/0016266 A1* | 1/2015 | Dumitrescu | H04L 47/623 370/236 |
| 2015/0113534 A1* | 4/2015 | Kanda | H04L 47/10 718/1 |
| 2015/0124832 A1* | 5/2015 | Ma | H04L 45/74 370/412 |
| 2017/0019369 A1* | 1/2017 | Ravinoothala, Sr. | H04L 61/103 |

\* cited by examiner

FIG.2B

| 230 | |
|---|---|
| 232A P1 TO VM1 | 234A D1 = 5 |
| 232B P5 TO VM2 | 234B D2 = 3 |
| 232C P8 TO VM3 | 234C D3 = 6 |
| 232D P13 TO VM4 | 234D D4 = 4 |

FIG.2C

| 230 | |
|---|---|
| 232A P1 TO VM1 | 234A D1 = 5 |
| 232B P16 TO VM5 | 234B D5 = 5 |
| 232C P8 TO VM3 | 234C D3 = 6 |
| 232D P13 TO VM4 | 234D D4 = 4 |

FIG.2D

| 230 | |
|---|---|
| 232A P1 TO VM1 | 234A D1 = 5 |
| 232B P16 TO VM5 | 234B D5 = 5 |
| 232C P8 TO VM3 | 234C D3 = 6 |
| 232D P20 TO VM6 | 234D D6 = 6 |

FIG.2E

| 230 | |
|---|---|
| 232A P30 TO VM1 | 234A D1 = 7 |
| 232B P16 TO VM5 | 234B D5 = 5 |
| 232C P8 TO VM3 | 234C D3 = 6 |
| 232D P20 TO VM6 | 234D D6 = 6 |

| 330 | |
|---|---|
| 332A P1 TO VM1 | 334A D1 = 5 |
| 332B P2 TO VM2 | 334B D2 = 3 |
| 332C P3 TO VM3 | 334C D3 = 6 |
| 332D P4 TO VM4 | 334D D4 = 4 |

FIG.3B

| 330 | |
|---|---|
| 332A P1 TO VM1 | 334A D1 = 5 |
| 332B P5 TO VM5 | 334B D2 = 5 |
| 332C P3 TO VM3 | 334C D3 = 6 |
| 332D P4 TO VM4 | 334D D4 = 4 |

FIG.3C

| 330 | |
|---|---|
| 332A P1 TO VM1 | 334A D1 = 5 |
| 332B P5 TO VM5 | 334B D5 = 5 |
| 332C P3 TO VM3 | 334C D3 = 6 |
| 332D P6 TO VM6 | 334D D6 = 7 |

DETECTING SLOW VIRTUAL DEVICES

TECHNICAL FIELD

The present disclosure relates to network communications with virtual devices, such as virtual machines executing on a host network device.

BACKGROUND

Virtual devices, such as virtual machines, are implemented in data centers where there are often many virtual devices or virtual machines running on the same server connecting to communication infrastructure, such as a communications infrastructure compliant with the Fiber Channel standard. Fiber Channel links may communicate data between the server and a Fiber Channel switch. Fiber Channel networks may slow down due to slow performance of one or more virtual devices or virtual machines.

In a Fiber Channel network, a recipient device issues credits which indicate to the transmitting device that it is allowed to send data packets. Each credit allows one packet (also called a frame) to be transmitted. The recipient device issues credits only when it can guarantee acceptance of a frame. When a frame arrives at the Fiber Channel switch egress port, the egress port checks if a credit is available, and only then is the packet transmitted. Once the recipient has received the frame, it is supposed to return a credit, in the form of a credit return, signaling that it is ready to receive another frame. Fiber Channel frames may be optical frames or "copper" frames depending on the media over which the Fiber Channel link is implemented.

BRIEF DESCRIPTION OF THE DRAWINGS

FIGS. 2A-2E are illustrations of a first series of packets and return credits sent and received while communicating with virtual devices, and the data used to detect slow virtual devices, according to an example embodiment.

FIGS. 3A-3D are illustrations of a second series of packets and return credits sent and received while communicating with virtual devices, and the data used to detect slow virtual devices, according to an example embodiment.

DESCRIPTION OF EXAMPLE EMBODIMENTS

Overview

A first packet is sent via a network from a first network device to a first virtual device executing on a second network device. A first credit return is received, via the network, at the first network device. A first time duration is calculated as a time between the sending of the first packet and receipt of the first credit return. A second packet is sent via the network from the first network device to a second virtual device executing on the second network device. A second credit return is received at the first network device. A second time duration is calculated as a time between the sending of the second packet and receipt of the second credit return. Relative performance rankings are assigned to the first virtual device and the second virtual device based upon at least the first time duration and the second time duration.

Example Embodiments

Figure 1:
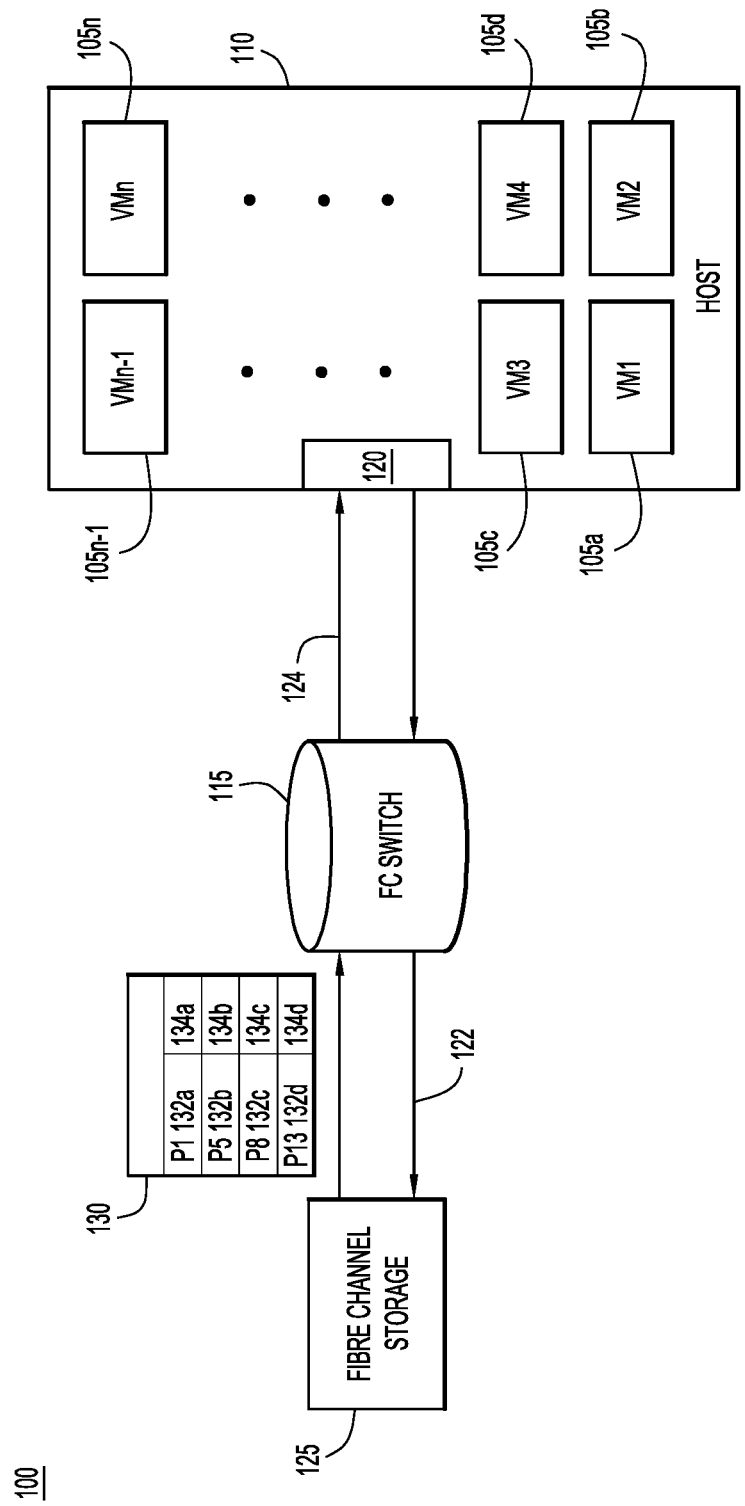
FIG. 1 is an illustration of a network environment configured to detect slow virtual devices, according to an example embodiment.

With reference made to FIG. 1, depicted therein is a network environment 100 that is configured to provide slow virtual device identification. According to the example embodiment of FIG. 1, a plurality of virtual devices (in this case, virtual machines 105a-105n) reside and are executed on host network device 110. Each of virtual machines 105a-105n connects to other devices, such as Fiber Channel switch 115 through physical port 120. For example, the storage for virtual machines 105a-105n may be contained in a separate Fiber Channel storage network connected device 125. When virtual machines 105a-105n need to access the contents of the storage, the contents are transmitted between Fiber Channel storage network connected device 125 and network device 110 via Fiber Channel link 122 Fiber Channel switch 115, Fiber Channel link 124 and physical port 120.

When messages are sent from Fiber Channel switch 115 to one or more virtual machines 105a-105n, the example embodiment of FIG. 1 utilizes a system known as "Buffer-to-Buffer Credits" that ensures that a buffer of network device 110 does not get overrun. Fiber Channel switch 115 and network device 110 negotiate a certain number of "credits" used to control the pace of their communication. One credit may correspond to one Fiber Channel frame. When Fiber Channel switch 115 sends a Fiber Channel frame to network device 110, it considers one of the credits unavailable until a credit return message (sometimes referred to as a receiver ready credit return) is received back from network device 110. If all of the credits are used up, Fiber Channel switch 115 will not send any Fiber Channel frames to network connected device 110 until at least one credit return message is received from network device 110. This system ensures that the buffer of network device 110 will not receive more Fiber Channel packets or frames from Fiber Channel switch 115 than there are credits, thereby preventing the buffer from getting overrun. In other words, Fiber Channel switch 115 expects an acknowledgment back from network device 110 in the form of a credit return to ensure that network device 110 can accept more frames. If Fiber Channel switch 115 does not receive the credit return, it will only send as much information as it has buffer credits, until it gets the acknowledgment it needs to continue.

When multiple virtual devices, such as virtual machines 105a-105n, are executing on a single device, such as network device 110, the Fiber Channel frames sent to any one of virtual machines 105a-105n will share the same address to physical port 120, with the specific one of virtual machines 105a-105n being identified by a virtual device identifier. A virtual device identifier may be any data that distinguishes between multiple virtual devices executing on the same host device. For example, one possible virtual device identifier may be a combination of a Destination ID (DID) and a Class Specific Control (CS_CTL) value, which are included in a Fiber Channel header. The credit returns sent back to Fiber Channel switch 115, on the other hand, do not contain any information identifying the virtual device to which the frame associated with the credit return was sent. This lack of virtual device identification information may be the result of a lack virtualization of the channel in traditional Fiber Channel implementations. Instead, the credit return will simply identify network device 110 and/or physical port 120 (e.g., the credit return may include an address corresponding to physical port 120 without any indication of which of virtual machines 105a-105n the credit return is associated with). The credit returns may not contain any virtual device identifier (e.g., a Source Identifiers (SIDs) for the virtual machine associated with the credit return or the DID from the Fiber Channel frame associated with the credit return). Therefore, even if the port 120 or host network device 110 is aware of which of virtual machines 105a-105n has received the frames sent from Fiber Channel switch 115, the credit returns may not allow for this information to be communicated back to Fiber Channel switch 115. Accordingly, if one of virtual machines 105a-105n is the cause of a slowdown, it may be difficult to determine which of virtual machines 105a-105n is the slow virtual device, as there is no way to distinguish which credit returns are associated with which virtual devices. In other words, while port 120 or host 110 may know which of virtual machines 105a-105n has not sent back its credits, implementations of the Fiber Channel standard may not provide a way to communicate this information to Fiber Channel switch 115.

One slow virtual device, such as one or more of virtual machines 105a-105n may cause network switch 115 to stop sending traffic to any of the other virtual devices executing on a host device. Specifically, when multiple virtual devices are executing on a single host device and multiple frames are sent to a low performing virtual device, there will be fewer, or in some instances, no credits left to send further frames to the other virtual devices executing on the host device. For example, if one of virtual machines 105a-105n is executing slowly such that it returns credits slowly or not at all, and this same virtual machine receives all of the credits from fiber channel switch 115, no more data can be sent to any of the other virtual machines 105a-105n even if these virtual machines are executing properly and/or performing well. On the other hand, if slow performing virtual devices can be identified, the slow performing virtual devices may be remedied, allowing for the faster return of credits and thereby allowing more traffic to be sent to all of the virtual devices executing on the host device. Described herein is a method for Fiber Channel switch 115 to deduce which virtual machines 105a-105n is holding onto credits without receiving this information directly and/or explicitly from port 120 or host 110.

In order to identify possibly slow virtual devices, Fiber Channel switch 115 maintains data 130. Included in data 130 are virtual device identifiers 132a-d and time duration values 134a-d. Data 130 may be maintained on a per port basis. Accordingly, data 130 is maintained for virtual devices that communicate with Fiber Channel switch via physical port 120. If network device 110 includes multiple ports, Fiber Channel switch 115 may contain additional data for the addition ports contained in network device 110. Accordingly, the techniques to be described below may be performed on a "per port" basis. Therefore, data 130 may also include other data to, for example, identify the port to which the data entries 132 and 134 apply. According to other example embodiments, data 130 may be maintained at the physical port of Fiber Channel switch 115 that services Fiber Channel link 124, with analogous data being maintained at, for example, the physical port servicing Fiber Channel link 122.

Data 130 may be populated as follows. When Fiber Channel switch 115 sends a Fiber Channel frame to one or more of virtual machines 105a-105n, Fiber Channel switch 115 stores the virtual device identifier associated with the Fiber Channel frame. For example the virtual device identifier may be a combination of a DID and a CS_CTL value.

Concurrent with the sending of the Fiber Channel frame, Fiber Channel switch 115 begins a timer. The timer determines a duration between the sending of the Fiber Channel frame and the receipt of the next credit return. The virtual device identifier and the duration may be stored in data 130 as virtual device identifier 132a and associated duration 134a. According to some example embodiments, one frame will be monitored at a time. In such embodiments, even if additional frames are sent between the starting of the timer and the receipt of the credit return (i.e., if additional frames are sent within duration 134a), these frames will not be monitored. This means timers will not be started for these additional frames and durations will not be recorded for these frames.

Virtual device identifier 132a and duration 134a may be maintained as data 130 in, for example, a data table. The monitoring is restarted for a subsequent Fiber Channel frame that is sent to one or more of virtual machines 105a-105n. Once the next credit return is received, the virtual device identifier associated with the Fiber Channel frame being monitored is compared against the virtual device identifiers stored in data 130. If there is no entry matching the virtual device identifier, the virtual device identifier may be stored in data 130 as virtual device identifier 132b, and the associated duration may be stored in data 130 as duration 134b.

If an entry exists for the identifier, the duration value is compared against the duration stored in data 130. The longer of the two duration values is retained in data 130. The reason the longer of the two values is retained is because the duration between the sending of the Fiber Channel frame and the receipt of the return credit associated with the Fiber Channel frame will always be at least as long as the recorded duration 134b. This is because duration 134b is the time between the sending of the Fiber Channel frame being monitored and the next received credit, regardless of whether the credit return is the credit return associated with the Fiber Channel frame being monitored. Therefore, duration 134b will indicate the best possible performance for the virtual device to which the Fiber Channel frame being monitored was sent.

According to the example of FIG. 1, this process may repeat until four different Fiber Channel frame identifiers and associated duration values are stored in data 130. Therefore, four virtual device identifiers 132a-d are recorded, each with an associated duration 134a-d that indicates the time between the sending of the Fiber Channel frame and receipt of the next credit return.

Once four values are stored in data 130, the monitoring process will continue, but instead of creating new values in data 130, values in data 130 may be replaced in response to the continued monitoring. For example, if there is no entry in data 130 matching the virtual device identifier associated with a newly monitored Fiber Channel frame, the duration value associated with the newly monitored Fiber Channel frame is compared against the lowest of the duration values 134a-d stored in data 130. If the duration values 134a-d are all longer than the newly monitored duration value, the newly monitored information is discarded. The newly monitored information is discarded because the newly monitored information is associated with a virtual device that is better performing than the virtual devices associated with the data already stored in data 130. As data 130 represents the four lowest performing virtual devices, the newly acquired data should not replace any of the data already stored in data 130.

On the other hand, if the newly monitored duration is longer than the lowest of durations 134a-d, the virtual device identifier and the duration associated with the newly monitored Fiber Channel frame replaces the values in data 130 with the shortest of duration values 134*a-d*. In other words, data 130 contains a running list of the longest durations between Fiber Channel frames sent to a particular virtual device and receipt of the next credit return. Furthermore, based upon durations 134*a-d*, a relative performance ranking may be determined for the virtual devices identified by virtual device identifiers 132*a-d*. Of course, other example embodiments may store more or fewer than four virtual device identifier/duration value combinations.

Based on the duration values 134*a-d*, further monitoring or maintenance may be performed on one or more of virtual machines 105*a*-105*n*. For example, if any one of duration values 134*a-d* exceeds a predetermined threshold, it may be determined that the virtual device identified by the virtual device identifier associated with the duration should be monitored or remediated. According to other example embodiments, notifications may be sent to a user indicating one or more of the virtual devices associated with longer durations, allowing the user to take steps to remediate the identified virtual devices. Other example embodiments may send messages to a management device for remediation of the identified virtual device. Remediation of the slow virtual devices may include reclassifying slow virtual device traffic to a lower quality of service (QoS) level or dropping the slow virtual device from the network connected device on which it is executing.

It is noted that a duration 134*a-d* associated with a virtual device identifier 132*a-d* is not necessarily the actual duration between the sending of the Fiber Channel frame and receipt of the credit return associated with the Fiber Channel frame. For example, between the sending of the Fiber Channel frame and receipt of the credit return associated with the Fiber Channel frame, an intervening credit return may be received at Fiber Channel switch 115. The duration between the sending of the Fiber Channel frame and the receipt of the intervening credit return may be recorded as one of durations 134*a-d* instead of the duration between the sending of the Fiber Channel frame and receipt of the return credit actually associated with the Fiber Channel frame. Nevertheless, the duration between the sending of the Fiber Channel frame and the receipt of the return credit associated with the Fiber Channel frame will always be at least as long as the recorded duration 134*a-d*

Furthermore, because the durations 134*a-d* associated with a particular virtual device is replaced each time a greater duration is recorded, the recorded duration 134*a-d* will approach or equal the actual duration between the sending of a Fiber Channel frame and receipt of the return packet associated with the Fiber Channel frame sent to a particular virtual device. Specifically, after multiple iterations of sending Fiber Channel frames to the particular virtual device, the probability will become greater that the duration 134*a-d* recorded in data 130 for the particular virtual device corresponds to the duration between the sending of the packet and receipt of the credit return associated with the packet.

Figure 2A:
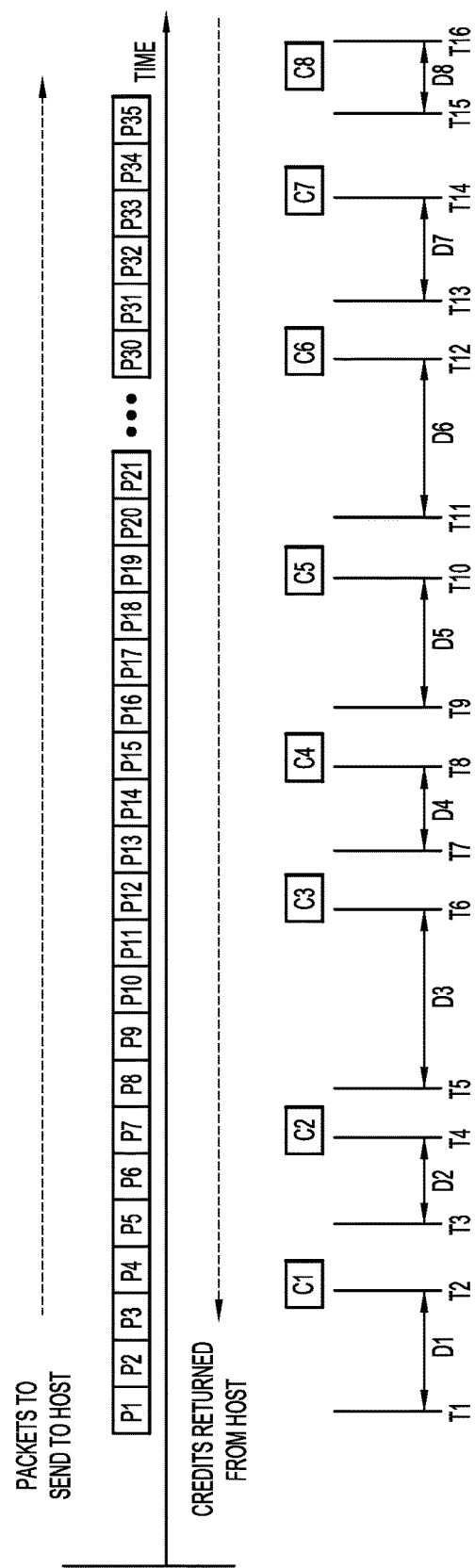

Reference is now made to FIGS. 2A-2E in which the process for populating data 130 of FIG. 1 is described in further detail using specific example packets, credit returns, and measured durations between a sent packet and a received credit return. Depicted in FIG. 2A are a series of packets P1-P21 (e.g., frames such as Fiber Channel frames) and return credits C1-C6 sent between, for example, Fiber Channel switch 115 and network connected device 110 of FIG. 1. FIGS. 2B-2E illustrate the evolution of data, such as data 130 of FIG. 1, that may be used to monitor the performance of virtual devices and/or identify low performing virtual devices. As illustrated in FIG. 2A, packet P1 is the first packet to be sent to a virtual device VM1, and it is sent at time T1. At time T2 a credit return C1 is received. Between time T1 and time T2 is a duration D1, which according to the present example is 5 ms. Credit return C1 may or may not be the credit return associated with packet P1, but it is now known that the duration associated with packet P1 is at least D1. In fact, it may not be possible to determine whether or not C1 is associated with packet P1 as C1 may not include any information identifying virtual device VM1 or any information identifying packet P1. As illustrated in FIG. 2B, entries 232*a* and 234*a* are recorded in data 230 identifying virtual device VM1 and duration D1. Between time T1 and time T2 three other packets are sent, but these packets are not monitored.

At time T3, packet P5 is sent to virtual device VM2. The next credit return, credit return C2, is received at time T4 after a duration D2 of 3 ms. Virtual device VM2 and duration D2 are recorded in data 230 as entries 232*b* and 234*b*, respectively. Similarly, at time T5 packet P8 is sent to virtual device VM3, and a credit return is received at time T6 after a duration D3 of 6 ms. Virtual device VM3 and duration D3 are recorded in data 230 of FIG. 2B as entries 232*c* and 234*c*, respectively. Finally, data 230 of FIG. 2B is fully populated after packet P13 is sent to virtual device VM4 at time T7, and credit return C4 is received at time T8 after a duration D4 of 4 ms. Virtual device VM4 and duration D4 are recorded in data 230 of FIG. 2B as entries 232*d* and 234*d*, respectively.

At time T9, packet P16 is sent to virtual device VM5, and credit return C5 is received at time T10 after duration D5 of 5 ms. Because data 230 of FIG. 2B has been populated, the entries within data 230 are compared to the identity of the virtual device to which packet P16 was sent, as well as to the length of duration D5. Packet P16 was sent to virtual device VM5, for which there is no entry in data 230 of FIG. 2B. As there is no entry for virtual device VM5, duration D5 is compared with entries 234*a-d* of FIG. 2B to determine if D5 is longer than any of these values. D5 has a value of 5 ms, which is larger than both of entries 234*b* and 234*d*. Because entry 234*b* is smaller than entry 234*d* (i.e., 3 ms<4 ms), the values of entries 232*b* and 234*b* are replaced by data indicating virtual device VM5 and duration D5, respectively, as illustrated in FIG. 2C. According to some example embodiments, the minimum duration in data 230 may be maintained or calculated. Accordingly, D5 need only be compared with the predetermined minimum value when determining whether or not D5 should replace one of the entries in data 230. If D5 is longer than the predetermined minimum (i.e., longer than entry 234*b*), the data indicating virtual device VM5 and duration D5 replaces the data associated with the minimum value (i.e., the data associated with entries 232*b* and 234*b*).

At time T11, packet P20 is sent to virtual device VM6, and credit return C6 is received at time T12 after duration D6 of 6 ms. The entries within data 230 of FIG. 2C are compared to the identity the virtual device to which packet P20 was sent, as well as compared to the length of duration D6. Packet P20 was sent to virtual device VM6, for which there is no entry in data 230 of FIG. 2C. As there is no entry for virtual device VM6, duration D6 is compared with entries 234*a-d* of FIG. 2C to see if duration D6 is longer than any of these values. Duration D6 has a value of 6 ms, which is larger than entries 234*a*, 234*b* and 234*d*, with 234*d* having the smallest of the three entries. Therefore, the values of entries 232*d* and 234*d* are replaced by data indicating virtual device VM6 and duration D6, respectively, as illustrated in FIG. 2D.

At time T14, packet P30 is sent to virtual device VM1, and credit return C7 is received at time T14 after duration D7 of 7 ms. The entries within data 230 of FIG. 2D are compared to the identity of the virtual device to which packet P30 was sent, as well as to the length of duration D7. Packet P30 was sent to virtual device VM1, for which there is already an entry in data 230 of FIG. 2D, specifically entries 232*a* and 234*a*. Because there is an entry for virtual device VM1, duration D7 is compared with entry 234*a* of FIG. 2D to see if D7 is longer than entry 234*a*. D7 has a value of 7 ms, which is larger than entry 234*a*. Therefore, the value of entry of 234*a* is replaced by data indicative of duration D7, as illustrated in FIG. 2E. If, on the other hand, D7 was less than entry 234*a*, D7 would have been discarded, and the value at entry 234*a* would have remained unchanged.

Finally, at time T15, packet P35 is sent to virtual device VM7, and credit return C8 is received at time T16 after duration D8 of 2 ms. The entries within data 230 of FIG. 2E are compared to the identity of the virtual device to which packet P35 was sent, as well as to the length of duration D8. Packet P35 was sent to virtual device VM8, for which there is no entry in data 230 of FIG. 2E. As there is no entry for virtual device VM8, duration D8 is compared with entries 234*a-d* of FIG. 2E to see if D8 is longer than any of these values. D8 has a value of 2 ms, which is not larger than any of entries 234*a-d*. Therefore, no changes are made to the data 230 of FIG. 2E.

When the process described in conjunction with FIGS. 2A-2E is implemented in a network device, such as Fiber Channel switch 110 of FIG. 1, that is configured to notify a user or device, or take mitigation steps when a duration value exceeds a predetermined threshold, each time data 230 of FIGS. 2B-2D is updated, a determination may be made whether or not the threshold has been met. For example, if the threshold duration is 7 ms, a notification may be sent to a user when data 230 was updated to reflect the data associated with the sending of packet P30 to virtual device VM1, as illustrated in FIG. 2E. This comparison and interrupt generation happens whenever an entry is updated in the data 230. On the other hand, if the network device implementing the process illustrated in FIGS. 2A-2E is further configured to provide a list of lowest performing virtual devices, a notification may be sent to a user or management network device every time one of entries 232*a-d* is updated to reflect a new virtual device. Accordingly, notifications may have been sent when entry 232*b* was updated as illustrated in FIG. 2C, as well as when entry 232*d* was updated as illustrated in FIG. 2D.

According to one specific example embodiment, a network device configured to implement the techniques described herein may utilize a programmable register which may be configured with a threshold of credit return delay beyond which an interrupt is generated for the software to take mitigation steps, like classifying the slow virtual device traffic to a lower QoS level or even dropping the virtual device from the network device on which it is executing. Instructions to take these mitigation steps may be sent from a device such as Fiber Channel switch 115 of FIG. 1 to a device such as network device 110, also of FIG. 1.

With reference now made to FIGS. 3A-3D, depicted therein is another example embodiment, in which after a packet is sent, no other packets are sent until a credit return is received. Accordingly, such a technique may be used to determine the actual delay time between the sending of a packet and the return of the credit associated with that packet. Therefore, such a technique may be used to definitively determine the current performance of virtual devices. Because no packets are sent between the sending of an initial packet and receipt of the return credit, the technique of FIGS. 3A-3D may be best applied as a diagnostic tool, or in implementations in which a device such as Fiber Channel switch 115 and network connected device 110, both of FIG. 1, have negotiated to communicate using only a single credit. In these scenarios, the durations recorded are the actual durations between the sending of the credit and the receipt of the credit return associated with that credit. The example embodiment described with reference to FIGS. 3A-3D may also occur in scenarios during normal operation in which all credits are consumed by a slow virtual device.

Figure 3A:
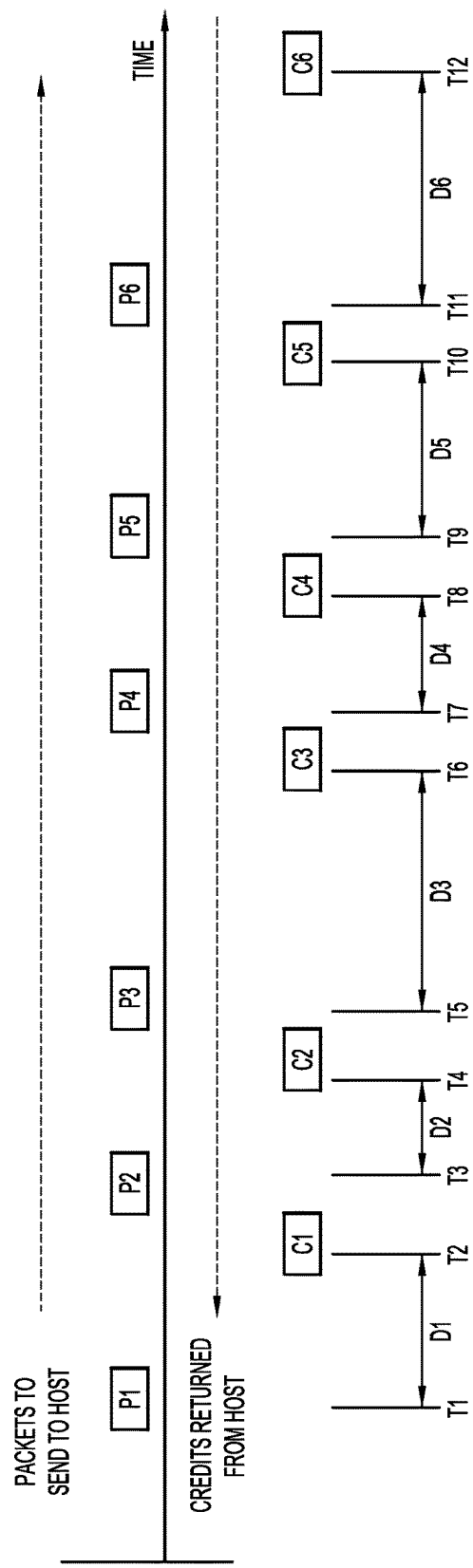

As illustrated in FIG. 3A, packet P1 is sent to virtual device VM1 at time T1, and a return credit C1 is received at time T2 after a duration D1 of 5 ms. Accordingly, the entries 332*a* and 334*a* are recorded in data 330. Similar operations result in entries 332*b-d* and 334*b-d* being populated as illustrated in FIG. 3B. FIG. 3A also illustrates packet P5 being sent to virtual device VM5 at time T9, receiving a credit return at time T10 after a duration D5 of 5 ms. Because duration D5 is greater than entries 334*b* and 334*d* of FIG. 3D, the data for P5, VM5 and D5 replaces the smaller of the two entries (i.e., replaces the smallest of all of the entries), and therefore, entries 332*b* and 334*b* are populated with the data for P1, VM5 and D5, as illustrated in FIG. 3C. Next, FIG. 3A illustrates packet P6 being sent to virtual device VM6 at time T11, receiving a credit return at time T12 after a duration D6 of 7 ms. Because D6 is longer than all of entries 334*a-d* of FIG. 3C, the data for P6, VM6 and D6 replaces the smallest of the entries, and therefore, entries 332*d* and 334*d* are populated with the data for P6, VM6 and D6, as illustrated in FIG. 3D. If it is assumed that the port to which data 330 applies only services six virtual devices, data 330 of FIG. 3D accurately represents the relative performances of the four lowest performing virtual devices associated with the port. Steps may be taken to mitigate this low performance through, for example, sending messages to users indicating low performing virtual devices, sending messages to management devices indicating low performing virtual devices, classifying the low performing virtual device traffic to a lower QoS level or dropping the virtual device from the network connected device on which it is executing.

Figure 4:
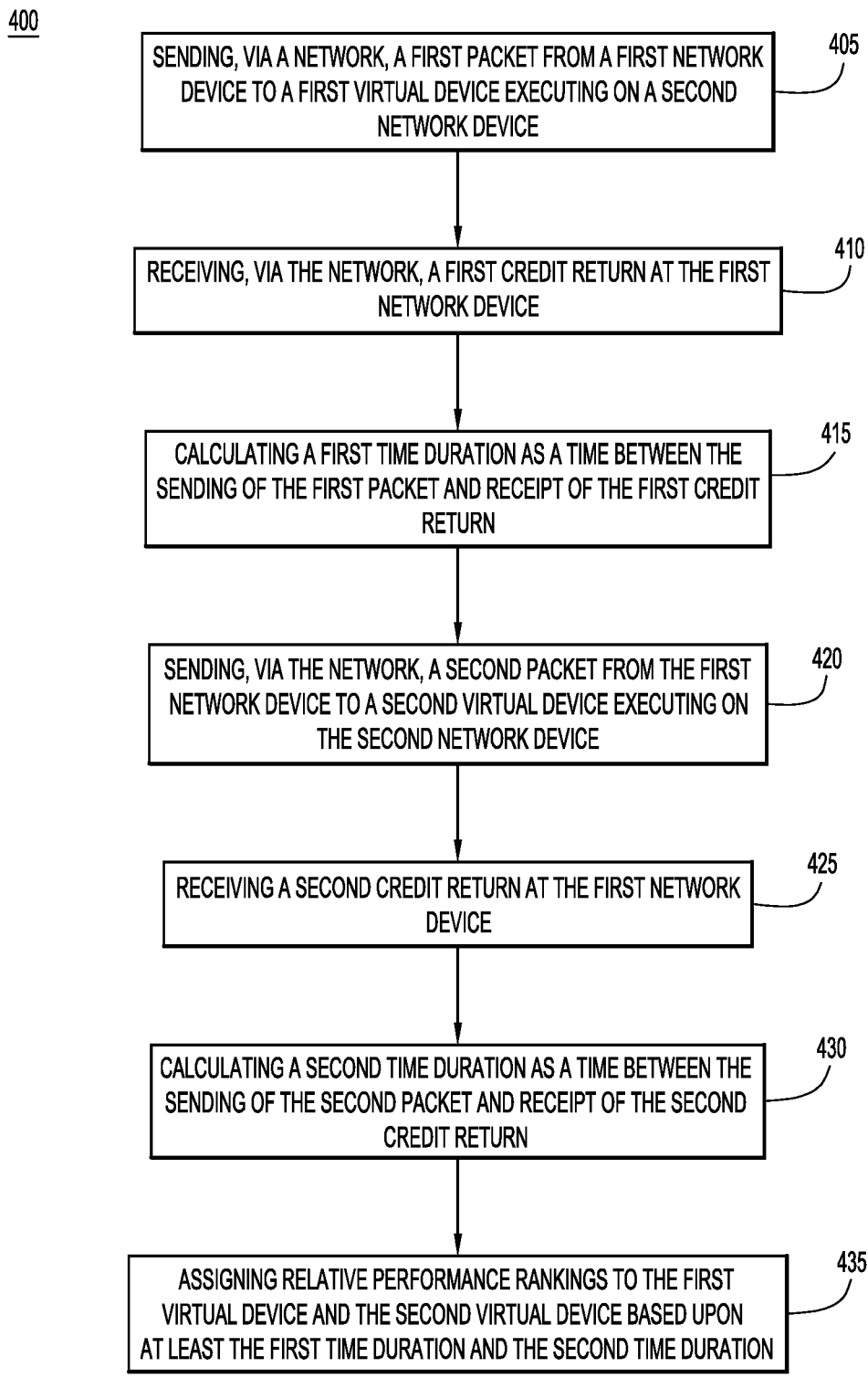
FIG. 4 is flowchart illustrating a process for detecting slow virtual devices, according to an example embodiment.

With reference now made to FIG. 4, depicted therein is a flowchart 400 illustrating a process for implementing the techniques described herein. Reference is also made to FIG. 1 for purposes of this description of FIG. 4. The process begins in operation 405 where a first packet is sent from a first network connected device to a first virtual device executing on a second network device via a network. The first packet may be embodied as a frame, such as a Fiber Channel frame. For example, the first network device of operation 405 may correspond to the Fiber Channel switch 115, the first virtual device may correspond to one of virtual machines 105*a*-105*n*, the second network device may correspond to network device 110, and the network may correspond to or include Fiber Channel link 124, all of which are shown FIG. 1. According to specific example embodiments, the frame may be embodied as an optical frame and the network may include an optical link, such as an optical Fiber Channel link.

In operation 410, a first credit return is received via the network at the first network device, and a first duration is calculated as a time between the sending of the first packet and receipt of the first credit return in operation 415. For example, operations 410 and 415 may correspond to the generation of some of data 130 from FIG. 1, data 230 of FIGS. 2A-E, and/or data 330 of FIGS. 3A-D.

In operation 420 a second packet is sent from the first network device to a second virtual machine executing on the second network device via the network. The "second packet" of operation 420 need not be the next packet sent from the first network device. In some example embodiments, intervening packets may be sent between the sending of the first packet of operation 405 and the sending of the second packet in operation 420. In operation 425, a second credit return is received at the first network device, and in operation 430 a second duration is calculated as a time between the sending of the second packet and receipt of the second credit return. Operations 425 and 430 may correspond to the generation of an additional entry in data 130 from FIG. 1, data 230 of FIGS. 2A-2E, and/or data 330 of FIGS. 3A-3D.

Finally, in operation 435, relative performance rankings are assigned to the first virtual device and the second virtual device based on upon at least the first duration and the second duration. The assignment of the relative performance rankings may include the replacement of data as illustrated in FIGS. 2A-2E and 3A-3D, the inclusion of entries in data 130 from FIG. 1, the inclusion of entries in data 230 of FIGS. 2A-2E, and/or the inclusion of entries in data 330 of FIGS. 3A-3D, and/or the determination of the lowest performing virtual devices as illustrated in FIGS. 1, 2A-2E and 3A-3D. In addition to the operations illustrated in FIG. 4, additional operations may include sending messages to users and/or management devices indicating the relative performance rankings, and/or mitigating the low performing virtual devices by, for example, classifying slow virtual device traffic to a lower QoS level or dropping low performing virtual devices from the network connected device on which it is executing.

Figure 5:
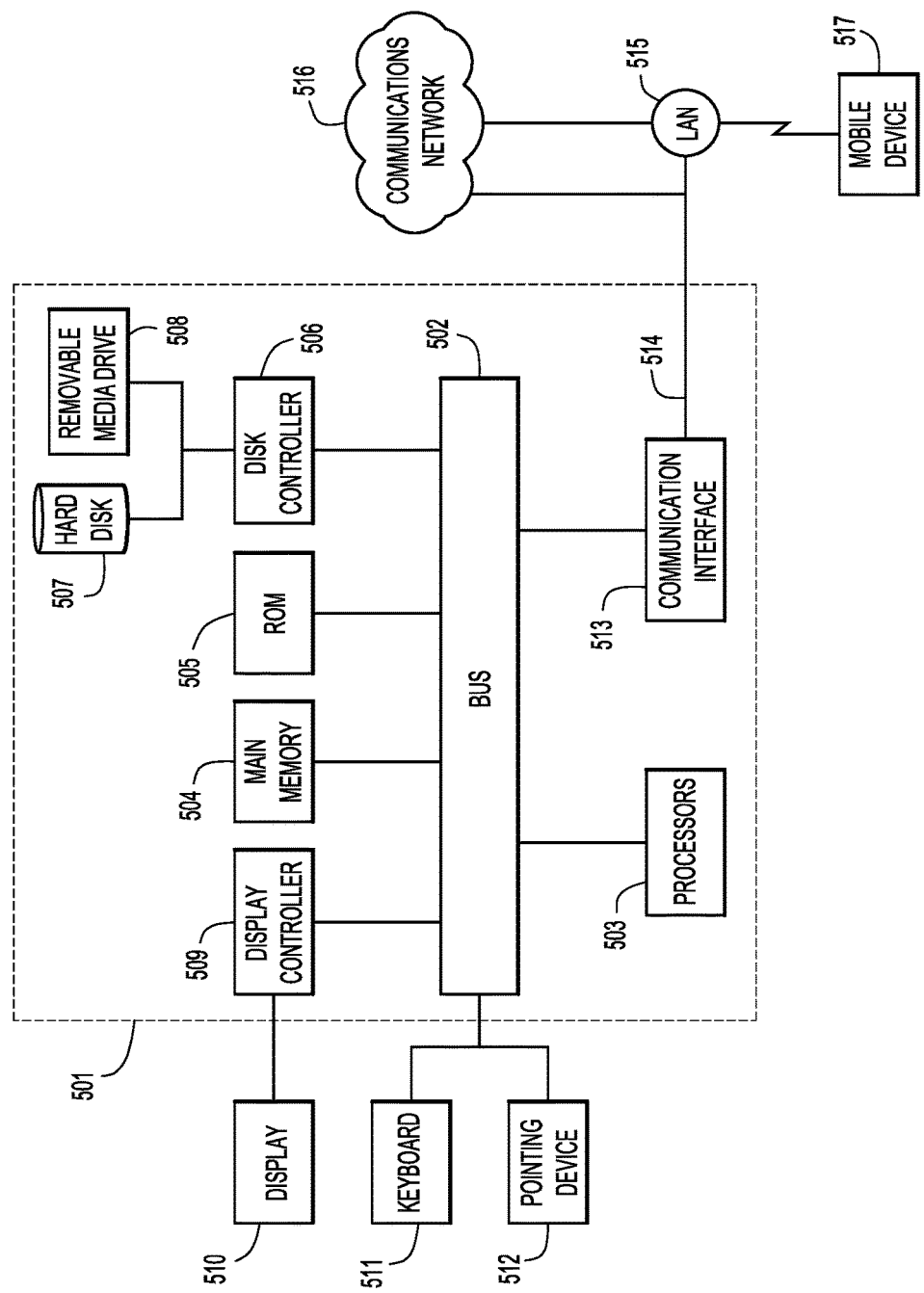
FIG. 5 is block diagram of an apparatus configured to detect slow virtual devices, according to an example embodiment.

With reference now made to FIG. 5, depicted therein is a computer system 501 upon which the embodiments presented may be implemented. The computer system 501 includes a bus 502 or other communication mechanism for communicating information, and a processor 503 coupled with the bus 502 for processing the information. While the figure shows a signal block 503 for a processor, it should be understood that the processors 503 represent a plurality of processing cores, each of which can perform separate processing. The computer system 501 also includes a main memory 504, such as a random access memory (RAM) or other dynamic storage device (e.g., dynamic RAM (DRAM), static RAM (SRAM), and synchronous DRAM (SD RAM)), coupled to the bus 502 for storing information and instructions to be executed by processor 503. In addition, the main memory 504 may be used for storing temporary variables or other intermediate information during the execution of instructions by the processor 503.

The computer system 501 further includes a read only memory (ROM) 505 or other static storage device (e.g., programmable ROM (PROM), erasable PROM (EPROM), and electrically erasable PROM (EEPROM)) coupled to the bus 502 for storing static information and instructions for the processor 503.

The computer system 501 also includes a disk controller 506 coupled to the bus 502 to control one or more storage devices for storing information and instructions, such as a magnetic hard disk 507, and a removable media drive 508 (e.g., floppy disk drive, read-only compact disc drive, read/write compact disc drive, compact disc jukebox, tape drive, and removable magneto-optical drive). The storage devices may be added to the computer system 501 using an appropriate device interface (e.g., small computer system interface (SCSI), integrated device electronics (IDE), enhanced-IDE (E-IDE), direct memory access (DMA), or ultra-DMA).

The computer system 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 501 may also include a display controller 509 coupled to the bus 502 to control a display 510, such as a cathode ray tube (CRT) or a light emitting diode (LED) display, for displaying information to a computer user. The computer system 501 may also include input devices, such as a keyboard 511 and a pointing device 512, for interacting with a computer user and providing information to the processor 503. The pointing device 512, for example, may be a mouse, a trackball, or a pointing stick for communicating direction information and command selections to the processor 503 and for controlling cursor movement on the display 510. The pointing device 512 may also be incorporated into the display device as, for example, a capacitive touchscreen and/or a resistive touchscreen. In addition, a printer may provide printed listings of data stored and/or generated by the computer system 501.

The computer system 501 performs a portion or all of the processing steps in response to the processor 503 executing one or more sequences of one or more instructions contained in a memory, such as the main memory 504. Such instructions may be read into the main memory 504 from another computer readable medium, such as a hard disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 501 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 501, for driving a device or devices for implementing the techniques presented herein, and for enabling the computer system 501 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 501 also includes a communication interface 513 coupled to the bus 502. The communication interface 513 provides a two-way data communication coupling to a network link 514 that is connected to, for example, a local area network (LAN) 515, or to another communications network 516 such as the Internet. For example, the communication interface 513 may be a wired or wireless network interface card to attach to any packet switched (wired or wireless) LAN. As another example, the communication interface 513 may be an asymmetrical digital subscriber line (ADSL) card, an integrated services digital network (ISDN) card or a modem to provide a data communication connection to a corresponding type of communications line. In another example embodiment, communication interface 513 may comprise an optical communication interface configured to send and receive frames, such as Fiber Channel frames. Communication interface 513 may be embodied as an optical interface. Communication interface 513 may also be embodied as a physical port, such as physical port 120 of FIG. 1. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local are network 515 (e.g., a LAN) or through equipment operated by a service provider, which provides communication services through a communications network 516. The local network 514 and the communications network 516 use, for example, electrical, electromagnetic, or optical signals that carry digital data streams, and the associated physical layer (e.g., CAT 5 cable, coaxial cable, optical fiber, etc.). The signals through the various networks and the signals on the network link 514 and through the communication interface 513, which carry the digital data to and from the computer system 501 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 501 can transmit and receive data, including program code, through the network(s) 515 and 516, the network link 514 and the communication interface 513. Moreover, the network link 514 may provide a connection through a LAN 515 to a mobile device 517 such as a personal digital assistant (PDA) laptop computer, or cellular telephone.

In summary, presented herein are techniques for identifying one or more slow virtual devices connected to a switch port without utilizing any equipment in addition to the switch port itself. By implementing the techniques described herein, real-time detection of low performing virtual devices (e.g., virtual machines) may be detected in, for example, a Fiber Channel switch, without needing to use additional equipment. The techniques described herein provide for simultaneous detection on all ports of a Fiber Channel switch without incurring additional capital or performance costs. Furthermore, the techniques described herein provide better integration with network management software, allowing for quick action to be taken to remediate low performing virtual devices. Furthermore, the techniques described herein can easily scale to larger and wide-ranging implementations as they do not experience the bandwidth limitations experienced by techniques that utilize additional equipment external to Fiber Channel switches.

Also presented herein is a method in which a first packet is sent from a first network device, via a network, to a first virtual device executing on a second network device. A first credit return is received via the network at the first network device. A first duration is calculated as a time between the sending of the first packet and receipt of the first credit return. A second packet is sent from the first network device, via the network, to a second virtual device executing on the second network device. A second credit return is received at the first network device. A second duration is calculated as a time between the sending of the second packet and receipt of the second credit return. Relative performance rankings are assigned to the first virtual device and the second virtual device based upon at least the first duration and the second duration.

In addition to the methods, an apparatus is provided that includes a network interface unit configured to enable communications over a network, and one or more processors coupled to the network interface unit. The processor is configured to: send, via the network interface unit over the network, a first packet to a first virtual device executing on a network device; receive, via the network interface unit from the network, a first credit return; calculate a first duration as a time between the sending of the first packet and receipt of the first credit return; send, via the network interface unit over the network, a second packet to a second virtual device executing on the network device; receive, via the network interface unit from the network, a second credit return; calculate a second duration as a time between the sending of the second packet and receipt of the second credit return; and assign relative performance rankings to the first virtual device and the second virtual device based upon at least the first duration and the second duration.

Also described herein are one or more tangible, non-transitory computer readable storage media encoded with software comprising computer executable instructions. The software, when executed, is configured to: send, via a network, a first packet from a first network device to a first virtual device executing on a second network device; receive, via the network, a first credit return at the first network device; calculate a first duration as a time between the sending of the first packet and receipt of the first credit return; send, via the network, a second packet from the first network device to a second virtual device executing on the second network device; receive a second credit return at the first network device; calculate a second duration as a time between the sending of the second packet and receipt of the second credit return; and assign relative performance rankings to the first virtual device and the second virtual device based upon at least the first duration and the second duration.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
sending, via a Fiber Channel link, a first packet from a first network device to a first virtual device executing on a second network device;
receiving, via the Fiber Channel link, a first credit return at the first network device, wherein the first credit return identifies the second network device but does not identify a virtual machine associated with the first credit return;
calculating a first duration as a time between the sending of the first packet and receipt of the first credit return;
sending, via the Fiber Channel link, a second packet from the first network device to a second virtual device executing on the second network device;
receiving, via the Fiber Channel link, a second credit return at the first network device, wherein the second credit return identifies the second network device but does not identify a virtual machine associated with the second credit return;
calculating a second duration as a time between the sending of the second packet and receipt of the second credit return;
assigning relative performance rankings to the first virtual device and the second virtual device based upon at least the first duration and the second duration;
identifying at least one of the first virtual device or the second virtual device as a slower performing device, and
remediating the slower performing device to improve the performance of the slower performing device.

2. The method of claim 1, further comprising identifying a lowest performing virtual device executing on the second network device based upon the relative performance rankings.

3. The method of claim 2, further comprising sending a notification to a user identifying the lowest performing virtual device.

4. The method of claim 1, wherein receiving the first credit return at the first network device comprises receiving a receiver ready credit return.

5. The method of claim 1, wherein sending the first packet comprises sending a frame.

6. The method of claim 1, wherein the first network device comprises a Fiber Channel switch.

7. The method of claim 1, further comprising:
storing data associating the first duration with the first virtual device;
storing data associating the second duration with the second virtual device;
sending, via the Fiber Channel link, a third packet from the first network device to the first virtual device executing on the second network device;
receiving, via the Fiber Channel link, a third credit return at the first network device;
calculating a third duration as a time between the sending of the third packet and receipt of the third credit return;
determining the third duration is greater than the first duration;
replacing the data associating the first duration with the first virtual device with data associating third duration with the first virtual device; and
assigning relative performance rankings to the first virtual device and the second virtual device based upon the third duration and the second duration.

8. The method of claim 1, further comprising:
storing data associating the first duration with the first virtual device;
storing data associating the second duration with the second virtual device;
sending, via the Fiber Channel link, a third packet from the first network device to the first virtual device executing on the second network device;
receiving, via the Fiber Channel link, a third credit return at the first network device;
calculating a third duration as a time between the sending of the third packet and receipt of the third credit return;
determining the third duration is less than the first duration; and
discarding the third duration and continuing to store the data associating the first duration with the first virtual device.

9. The method of claim 1, wherein the first credit return is different from a credit return associated with the sending of the first packet.

10. The method of claim 9, wherein the first duration is less than a duration between the sending of the first packet and receipt of the credit return associated with the sending of the first packet.

11. An apparatus comprising:
a network interface unit configured to communicate over a Fiber Channel link of a network; and
a processor coupled to the network interface unit, wherein the processor is configured to:
send, via the network interface unit over the Fiber Channel link, a first packet to a first virtual device executing on a network device;
receive, via the network interface unit from the Fiber Channel link, a first credit return that identifies the first network device but does not identify a virtual machine associated with the first credit return;
calculate a first duration as a time between the sending of the first packet and receipt of the first credit return;
send, via the network interface unit over the Fiber Channel link, a second packet to a second virtual device executing on the network device;
receive, via the network interface unit from the Fiber Channel link, a second credit return that identifies the first network device but does not identify a virtual machine associated with the second credit return;
calculate a second duration as a time between the sending of the second packet and receipt of the second credit return;
assign relative performance rankings to the first virtual device and the second virtual device based upon at least the first duration and the second duration;
identify at least one of the first virtual device or the second virtual device as a slower performing device, and
remediate the slower performing device to improve the performance of the slower performing device.

12. The apparatus of claim 11, further comprising a memory, and wherein the processor is further configured to:

store, in the memory, data associating the first duration with the first virtual device;
store, in the memory, data associating the second duration with the second virtual device;
send, via the network interface unit over the Fiber Channel link, a third packet to the first virtual device executing on the network device;
receive, via the network interface unit from the Fiber Channel link, a third credit return;
calculate a third duration as a time between the sending of the third packet and receipt of the third credit return;
determine the third duration is greater than the first duration;
replace, in the memory, the data associating the first duration with the first virtual device with data associating third duration with the first virtual device; and
assign relative performance rankings to the first virtual device and the second virtual device based upon the third duration and the second duration.

13. The apparatus of claim 11, further comprising a memory, and wherein the processor is further configured to:
store data associating the first duration with the first virtual device in the memory;
store data associating the second duration with the second virtual device in the memory;
send, via the network interface unit over the Fiber Channel link, a third packet to the first virtual device executing on the network device;
receive, via the network interface unit from the Fiber Channel link, a third credit return;
calculate a third time duration as a time between the sending of the third packet and receipt of the third credit return;
determine the third duration is less than the first duration; and
discard the third duration and continuing to store in the memory the data associating the first duration with the first virtual device.

14. The apparatus of claim 11, wherein the first credit return is different from a credit return associated with the sending of the first packet.

15. One or more non-transitory computer readable storage media encoded with software comprising computer executable instructions and when the software is executed operable to:
send, via a Fiber Channel link, a first packet from a first network device to a first virtual device executing on a second network device;
receive, via the Fiber Channel link, a first credit return at the first network device, wherein the first credit return identifies the second network device but does not identify a virtual machine associated with the first credit return;
calculate a first duration as a time between the sending of the first packet and receipt of the first credit return;
send, via the Fiber Channel link, a second packet from the first network device to a second virtual device executing on the second network device;
receive, via the Fiber Channel link, a second credit return at the first network device, wherein the second credit return identifies the second network device but does not identify a virtual machine associated with the second credit return;
calculate a second duration as a time between the sending of the second packet and receipt of the second credit return;
assign relative performance rankings to the first virtual device and the second virtual device based upon at least the first duration and the second duration;
identify at least one of the first virtual device or the second virtual device as a slower performing device, and
remediate the slower performing device to improve the performance of the slower performing device.

16. The computer readable storage media of claim 15, wherein the instructions are further operable to:
store, in a memory, data associating the first duration with the first virtual device;
store, in the memory, data associating the second duration with the second virtual device;
send, via the Fiber Channel link, a third packet from the first network device to the first virtual device executing on the second network device;
receive, via the Fiber Channel link, a third credit return at the first network device;
calculate a third duration as a time between the sending of the third packet and receipt of the third credit return;
determine the third duration is greater than the first duration;
replace, in the memory, the data associating the first duration with the first virtual device with data associating third duration with the first virtual device; and
assign relative performance rankings to the first virtual device and the second virtual device based upon the third duration and the second duration.

17. The computer readable storage media of claim 15, wherein the instructions are further operable to:
store, in a memory, data associating the first duration with the first virtual device;
store, in the memory, data associating the second duration with the second virtual device in the memory;
send, via the Fiber Channel link, a third packet from the first virtual device to the first virtual device executing on the second network device;
receive, via the Fiber Channel link, a third credit return from the first virtual device;
calculate a third time duration as a time between the sending of the third packet and receipt of the third credit return;
determine the third duration is less than the first duration; and
discard the third duration and continuing to store in the memory the data associating the first duration with the first virtual device.

18. The method of claim 1, wherein remediating the slower performing device comprises one or more of monitoring the performance of the slower performing device, reclassifying the slower performing device to a lower quality of service (QoS) level, or dropping the slower performing device from the second network.

19. The apparatus of claim 11, wherein the processor is configured to remediate the slower performing device by performing at least one of monitoring the performance of the slower performing device, reclassifying the slower performing device to a lower quality of service (QoS) level, or dropping the slower performing device from the second network.

20. The computer readable storage media of claim 15, wherein the instructions operable to remediate the slower performing device comprise instructions operable to perform at least one of monitoring the performance of the slower performing device, reclassifying the slower performing device to a lower quality of service (QoS) level, or dropping the slower performing device from the second network.

* * * * *